United States Patent [19]
Clauss, Jr. et al.

[11] 3,830,082
[45] Aug. 20, 1974

[54] TRANSMISSION

[75] Inventors: Julius A. Clauss, Jr., Birmingham; Jack S. Conley, Milford; Robert W. Lemon, Farmington, all of Mich.

[73] Assignee: Berg-Warner Corporation, Chicago, Ill.

[22] Filed: Dec. 4, 1972

[21] Appl. No.: 311,605

Related U.S. Application Data

[62] Division of Ser. No. 67,326, Aug. 27, 1970, Pat. No. 3,724,626.

[52] U.S. Cl. ............... 64/15 C, 64/27 C, 64/27 R, 403/3 SS
[51] Int. Cl. ............................................ F16d 3/52
[58] Field of Search .... 64/15 C, 15 R, 27 CT, 27 C, 64/27 F, 27 R; 287/52.08, 53 TK; 192/81 C; 403/3 SS

[56] References Cited
UNITED STATES PATENTS

| | | | |
|---|---|---|---|
| 2,135,323 | 11/1938 | Brantingson | 287/52.08 |
| 2,426,219 | 8/1947 | Jackson | 287/53 TK |
| 3,038,322 | 6/1962 | Wilson | 64/15 R |

FOREIGN PATENTS OR APPLICATIONS

| | | | |
|---|---|---|---|
| 1,241,197 | 8/1960 | France | 64/4 |
| 330,313 | 12/1920 | Germany | 64/27 R |

*Primary Examiner*—Samuel Scott
*Assistant Examiner*—Randall Heald
*Attorney, Agent, or Firm*—Donald W. Banner

[57] ABSTRACT

An automatic transmission providing variable speed ratio and reverse drives between drive and driven shafts and including friction-engaging devices, in the form of friction clutches and brakes, for establishing the drives. The devices are operable by hydraulic servomotors, certain servomotors each having first and second pistons arranged in tandem, with the first piston being movable by hydraulic fluid to engage the associated friction device, the second piston being movable by hydraulic fluid to also move the first piston during the application of hydraulic fluid to the first piston to thereby substantially double the effective area of the pistons of the servomotor to provide additional increased pressure to the engaged friction device. The transmission also includes an hydraulic governor fixed to the driven shaft by a locking spring clamp connector positively holding and keying the governor to the shaft in a simple assembly operation and in a manner to insure sealing between fluid-passage ports in the shaft and in the governor body for transfer of activating hydraulic fluid.

2 Claims, 4 Drawing Figures

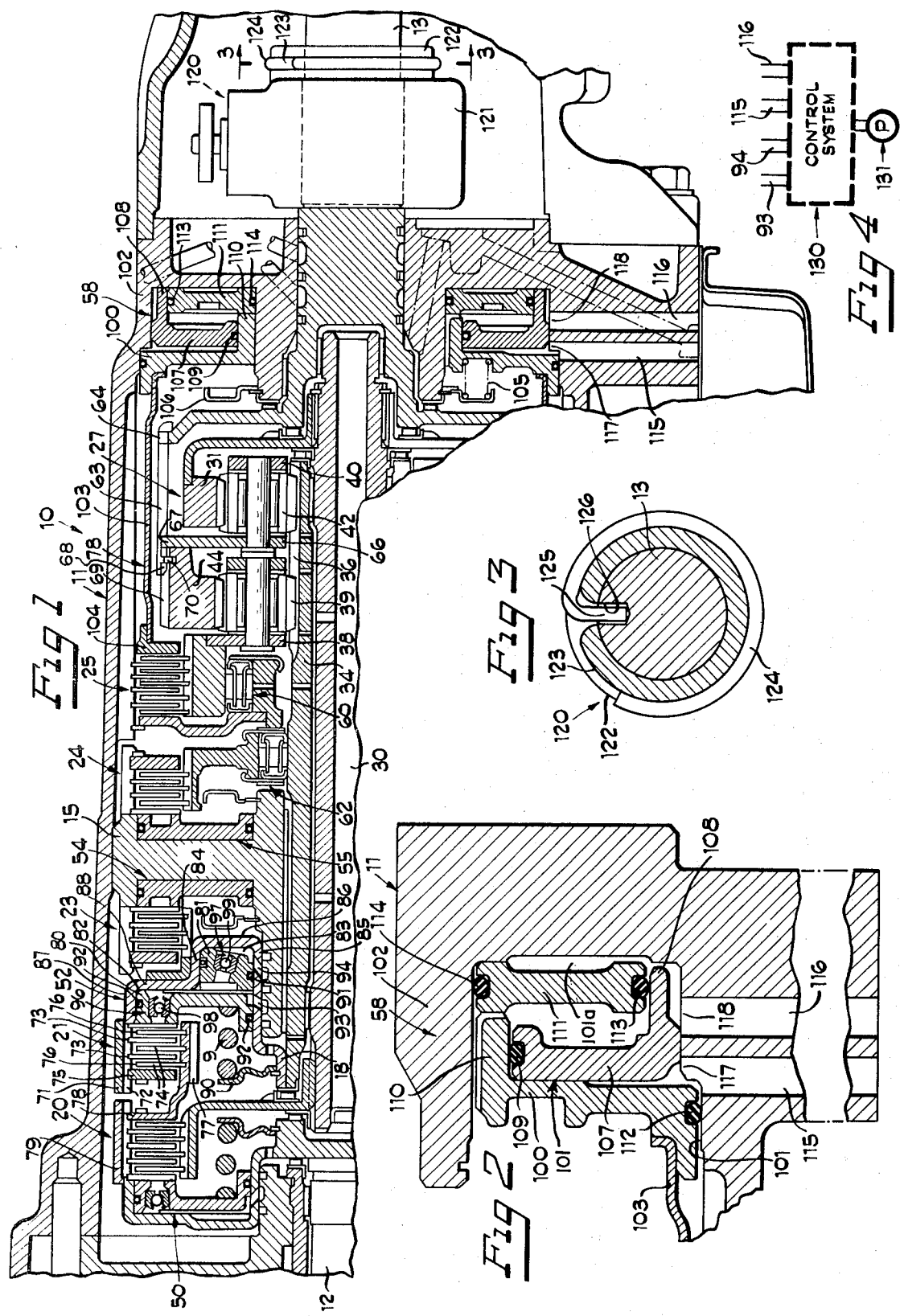

3,830,082

TRANSMISSION

This is a division of application Ser. No. 67,326 filed Aug. 27, 1970, now U.S. Pat. No. 3,724,626.

SUMMARY OF THE INVENTION

This invention relates to transmissions, and more particularly to such transmissions employing hydraulically-operated friction-engaging devices for establishing forward speed ratio and reverse drives to the transmission, and speed-responsive means controlling hydraulic operation of at least one of the devices.

In automatic transmissions, friction-engaging devices, in the form of brakes and clutches assemblies, have their drive and driven friction elements engaged by pistons of hydraulic servomotors to establish forward and reverse drives of the transmission. It is important that the drive and driven friction elements be engaged with the proper hydraulic force by the servomotors to insure retention of the selected drive. In particular, in reverse drive with certain planetary gear sets as with the one disclosed herein, in reverse drive the friction elements must handle a torque load much higher than in forward drive. For this purpose, a servomotor apply piston having a large effective area, exposed to hydraulic pressure, is desirable for reverse drive; but this size piston is frequently unacceptable due to space limitations for the transmission in the automobile.

Another object of the invention is to provide an improved hydraulic servomotor for a drive-control friction-engaging device in the form of a clutch and in which large and small pistons are disposed in a hydraulic cylinder with the large piston engaging the friction device for reverse drive and the small piston engaging the large piston in forward drive, and actuatable by hydraulic fluid to move the large piston to engage the device with light pressure. In this way, sufficient engaging pressure is provided for reverse, however, a smaller effective piston area is used in forward to prevent the harsh shifting which would result if the same engaging force was used for forward drive. The additional force is unnecessary due to the smaller torque being transmitted in forward drive.

An object of the invention is to provide improved hydraulic servomotors for friction-engaging devices, such as clutches and brakes.

Another object of the invention is to provide an improved hydraulic servomotor for drive-control friction-engaging device in the form of a brake in which dual pistons are disposed in a hydraulic cylinder with the one piston engaging the friction device and the other piston engaging the one piston and actuatable by hydraulic fluid to move the one piston to engage the device with light pressure for forward drive; and in reverse drive both pistons having hydraulic fluid applied thereto to engage the device with an application of a substantially larger force due to the larger effective piston area. Due to the tandem arrangement of the servomotor and the specific structure of same as to be described herein having the pistons in a generally axial arrangement, the dual piston area has been provided without increasing the radial dimension of the servomotor structure.

Another object of the invention is to provide an improved transmission providing forward speed ratio and reverse drives between drive and driven shafts, and having a friction engaging device for completing the drives, and a hydraulic servomotor controlling operation of the device and including spaced chambers having pistons arranged to provide cumulative working areas exposed to fluid under pressure flowing into the respective chambers from separate passages connected to a pump so that the servomotor is effective to operate rapidly in applying and releasing the device.

Another object of the invention is to provide an improved mechanism for assemblying an hydraulic governor and a shaft to positively hold the governor on the shaft in a manner insuring aligning the hydraulic ports of the governor shaft while inhibiting any tendency of the governor to vibrate.

Another object of the invention is to provide an improved and simplified assembly of an hydraulic governor and shaft, including a split spring ring clip disposed within a circular groove in an annular wall of the governor and having one end bent to extend radially inwardly through the governor wall into a recess in the shaft to key the governor to the shaft.

DESCRIPTION OF THE DRAWINGS

FIG. 1 is a cross-sectional view of a transmission incorporating the improvements of the present invention;

FIG. 2 is an enlarged cross-sectional view in detail of part of the transmission;

FIG. 3 is a cross-sectional view taken along line 3-3 of FIG. 1; and

FIG. 4 is a schematic view of a control system for use with the transmission of FIG. 1.

Referring to FIG. 1, a transmission mechanism 10 is illustrated and includes a transmission casing or case 11, an input shaft 12 and an output shaft 13. Fixed in the case 11 is a stationary sleeve 15 which has incorporated therein several of the friction engaging mechanisms for the transmission mechanism. Also provided in the transmission case 11 are a plurality of friction-engaging devices including a pair of friction clutches 20 and 21, friction brake mechanism 23, 24, and 25, and a planetary gear set 27. An intermediate shaft 30 interconnects clutch 20 with an annulus or ring gear 31 in the gear set, an intermediate shaft 34 interconnects clutch 21 with a double sun gear arrangement 36 for the gear set 27. The planetary gear set 27 further includes a planetary gear carrier 38 having planetary pinions 39 journalled thereon and a planetary carrier 40 having planetary pinions 42 journalled thereon. The planetary pinions 42 mesh with the annulus gear 31 and the sun gear 36. There is further provided an annulus or ring gear 44 meshing with planetary pinions 39. A cylindrical torque transmitting member or sleeve 63 is provided which interconnects planetary carrier 40, annulus gear 44, and output shaft 13. Slots 64 are provided in one end of the member 102 for engagement by teeth 65 on output shaft 13. The planetary carrier plate 66 is provided with teeth 67 received within axially extending grooves 68 in the sleeve 63, which grooves also receive splines 69 on ring gear 44. A split retainer ring 70 is received within opposed circumferentially extending grooves in the sleeve 63 and ring gear 44 to hold the ring gear 44 and sleeve 63 in assembly.

A hydraulic servomotor 50 is provided for clutch 20 and a hydraulic servomotor 52 is provided for clutch 21. A hydraulic servomotor 54 is provided for friction brake 23, and a hydraulic servomotor 55 is provided for friction brake 24. A hydraulic servomotor 58 is provided at the rear of the transmission case 11 for the friction brake mechanism 25. A one-way brake 60 is provided for the planetary carrier 38, and a one-way brake 62 is provided between friction brake 24 and intermediate shaft 34.

Operation of the transmission mechanism as described above and relating to the schematic showing in FIG. 1 is as follows: when clutches 20 and 21 are disengaged, a neutral condition is established.

Low or first speed ratio drive ratio is established by application of clutch 20 connecting shaft 30 with input shaft 12 thereby driving annulus gear 31 in the forward direction. The planetary carrier 40 is connected to output shaft 13 thereby providing a forward drive of the output shaft 13 at a reduced speed, one-way brake 60 holding planetary carrier 38 to provide a reaction element for the planetary gear set. A manual first speed drive ratio, similar to the one-way drive just described, may be provided by engagement of friction brake 25 by means of hydraulic servomotor 58 holding planetary carrier 38 against rotation in either direction thereby establishing a two-way drive through the planetary gear set.

Second speed ratio drive is provided by clutch 20 remaining engaged and by engagement of friction brake 24 by hydraulic servomotor 55 thus holding the sun gears 36 stationary. Under these conditions, a higher speed forward drive is provided by the planetary carrier 40 driving input shaft 12 at a reduced speed with one-way brake 62 being made effective to hold the sun gears 36 stationary establishing a one-way drive connection for second speed ratio. Optionally, brake 23 may be applied to hold shaft 34 against rotation in either direction to provide a two-way second speed ratio drive.

Third speed ratio drive is provided by clutch 20 remaining engaged and clutch 21 being engaged by hydraulic servomotor 52 thereby locking shafts 34 and 30 together and locking up the planetary gear set and providing a 1:1 forward drive of the output shaft 13.

Reverse drive ratio is established by engagement of clutch 21 and engagement of friction brake 25, the sun gear 36 thus being driven in a forward direction, planetary carrier 38 being held stationary and thus driving annulus gear 44 and thereby output shaft 13 in the reverse direction.

Referring to FIG. 1, the improved hydraulic servomotor 52 for accomplishing the operation of the friction clutch 21 is designed to provide sufficient pressure by its piston assembly to insure engagement of the clutch during varying torque-transmission ratios provided by the planetary gearing and its brake and clutch controls. More particularly, during establishment of reverse drive, the torque transmitted through clutch 21 is considerably higher than the torque transmitted in the third speed or direct drive ratio when clutches 20 and 21 share the torque load. Accordingly, it is imperative that the friction clutch 21 be engaged with greater pressure during reverse drive than the pressure applied during third speed ratio.

Describing the clutch and servomotor mechanism, an annular drum 71 has its radially inner face of its outer wall provided with splines 72 formed therein for receiving tangs 73 on friction plates 74 and a backing plate 75. Friction plates 74 are interleaved with friction plates 76 and are splined to the cylindrical portion 78 of a member 77, the member 77 having a disc-like end portion 78 splined to the drum 79 of clutch 20 to form a backing plate, which has its radially inner edge keyed to the drive shaft 12. The drum 71 has a radially inner peripheral cylindrical portion 18 in splined engagement with the end of the sleeve shaft 34, so that upon the clutch plates 74, 75 and 76 being engaged by the servomotor 52, rotation of drive shaft 12 will rotate the sleeve shaft 34.

The servomotor 52 comprises annular pistons 80 and 81 of different sizes and respectively mounted in a common cylinder including large and small chambers 82 and 83 in drum 71, chamber 83 being defined by spaced cylindrical walls 84 and 85 and a radially extending wall 86 connecting the walls 84 and 85, and chamber 82 being provided by spaced inner and outer cylindrical walls 85 and 87 and radial wall 88, as well as piston 81 which engages the piston 80. A coil spring 9 has one end seated against the piston 80 and its other end engaging a spring seat 90 secured on the drum portion 18 so that the spring is operative to urge the pistons 80 and 81 to the positions shown in FIG. 1.

Packing rings 91 prevent leakage of fluid from the chamber 83 around the outer and inner faces of piston 81 into the chamber 82 and from chamber 83 into chamber 82, while packing rings 92 prevent leakage of fluid from the chamber 82 around the outer and inner faces of piston 80 into the drum.

Pistons 80 and 81 are provided with centrifugally-operated relief valves 96 and 97 for controlling the release of fluid from the chambers 82 and 83 and including balls 98 and 99 operable to close drain passages in the pistons when the balls are urged by fluid under pressure in the chambers, and to open the passages when pressure is relieved and centrifugal force causes the balls to move to open the passages.

To provide fluid under pressure to the chambers 82 and 83 to actuate pistons 80 and 81, spaced passages 93 and 94 are formed in the cylindrical wall 85 of the drum respectively communicating with chambers 82 and 83 and also with spaced annulus grooves in the stationary sleeve 15 connected to suitable valving 130 schematically illustrated in FIG. 4 operable to selectively control flow of fluid under pressure from an engine driven pump 131 to either the passage 93 or to both passages 93 and 94.

In the operation of clutch 21 to provide third speed ratio or direct drive, when the clutch 20 is also engaged, liquid under pressure is directed to the passage 94 and to chamber 83 to move piston 81 and thereby abutting piston 80 to engage the clutch plates 74 and 76. It will be noted, that at this time, chamber 82 is devoid of fluid so that the piston 81 must contact the piston 80 to move the piston 80 and the friction clutch plates. Reverse drive is obtained by engaging clutch 21 and brake 25. To obtain reverse drive and to insure maintenance of the increased engaging force required of this drive, clutch 21 is engaged by fluid under pressure directed to the passages 93 and 94 and into chambers 82 and 83 to apply fluid under pressure to piston 80 and thereby materially increase the force applied to the clutch plates to engage the clutch 21. This will be apparent because the larger effective area of piston 80 is subject to fluid under pressure. The fluid under pressure applied to the smaller effective area of the piston 81 is balanced by the pressure of fluid in chamber 82.

Referring to FIGS. 1 and 2, and as previously described, the improved hydraulic servomotor 58 is effective to operate the brake 25 to provide a two-way drive in the first or low speed ratio, when the clutch is engaged. Also, the servomotor 58 is operative to engage the brake 25 for reverse drive, when the clutch 21 is engaged. The servomotor 58 comprises a piston 100 axially slidably mounted in an annular large chamber 101 in a hydraulic cylinder 102 and engaging an annular thrust-transmitting member 103 providing a connection between piston 100 and pressure apply plate 104 of brake 25. The piston 100 urged to the right by a coil spring 105 having one end seated against a retaining ring 106 fixed to the cylinder 102. A member in the form of a drum 107 is slidably positioned within a smaller chamber 101 of cylinder 102 with its rim 108 engaging the radially outer surface of the chamber and its inner periphery having a seal 109 engaging the axially extending wall 110 of piston 100.

On the side of drum 107 remote from piston 100 is a second piston 111 abutting piston 100. The piston 100, drum 107 and piston 111 are annular in configuration, and an axially extending wall 110 of piston 100 has its peripheral edge abutting the piston 111. A seal 112 is disposed between the piston 100 and case 102. Suitable seals 113 and 114 are disposed within grooves in the inner and outer peripheral edges of piston 111 and engage the inner surface of the cylinder 102 and the rim 108 of drum 107. Hydraulic fluid supply passages 115 and 116 are provided in the casing 11, the passage 115 terminating in a port 117 in chamber 101 between the piston 100 and drum 107 and the passage 116 terminating in a port 118 providing fluid between the right end of the cylinder chamber 101a and piston 111. Accordingly, fluid under pressure flowing through the two ports 117 and 118 into the chamber 101a are separated by the drum 107 so that the fluid entering port 117 acts only between piston 100 and drum 107 and fluid entering port 118 is operative to act only on piston 111.

Servomotor 58 may be actuated by valving 130 to selectively supply pressure to passage 115 or to both passages 115 and 116 as will now be described. In operation of servomotor 58 to engage brake 25 to provide two-way drive in first or low speed ratio, with clutch 20 engaged, fluid under pressure is directed by suitable valving 130 to passage 115 and through port 117 to cause piston 110 to move to the left to engage the brake. To obtain reverse drive, when clutch 21 is engaged, considerably greater force is exerted by the servomotor to engage the brake 25 since fluid under pressure is directed to passage 116 and port 118, as well as to passage 115 and port 117, to move pistons 100 and 111 in tandem to apply the brake 25, due to the double area of pistons 110 and 111, acted upon by the fluid under pressure.

An advantageous feature of the servomotor 58 is the rapid application and release of the brake 25 for reverse drive due to the fact that the servomotor is fed and drained by two passages 115 and 116. Further, by utilizing separate passages the flexibility of control of the servomotors is increased; for example, oil can be supplied to actuate the two pistons in sequence and to provide rapid release of the brake both passages can be exhausted at the same time.

REferring now to FIGS. 1 and 3, a hydraulic governor 120 is connected to the driven shaft 13 and is responsive to the speed of rotation of the driven shaft to provide a signal pressure variable with the speed of the driven shaft to the valving 130 for controlling the brakes and clutches to provide automatic shifting between first, second, and third speeds. An improved assembly of the governor 120 and shaft 13 is provided to securely fasten the governor to the shaft. More particularly, the shaft 13 and the governor 120 are in telescoping relation as the shaft extends through the governor. The governor has its housing or body 121 formed at one end with a circular flange 122 provided with an annular groove 123 receiving a resilient split member 124 in the form of a spring retainer wire having one end bent to provide a tab 125 extending inwardly into a radially drilled hole 126 in the shaft 13. It will be noted that the end of the keying tab 125 engages the bottom of hole 126 in the shaft and allows the member 124 to be free of the body adjacent to the tab so that a side loading effect is achieved. This feature is advantageous as the governor body is held tight to one side of the shaft in order to obtain better sealing between the fluid flow passages in the shaft and the ports in the governor body. It may be noted that this assembly provides positive keying and accurate axial location of the governor on the shaft by a relatively simple manual operation. Also, by virtue of the spring clamping action plus the ability of the retainer to wrap itself about the shaft, any tendency to vibrate is inhibited. Proper assembly and seating of the retainer is readily determined by quick visual inspection requiring no gauging.

While there has been shown the improved assembly of an hydraulic governor and a shaft, it is to be understood such disclosure is only by way of example, as it is obvious that the concept may be used in a variety of many other uses, such as keying a spur gear to a shaft.

Various features of the invention have been particularly shown and described; however, it should not be limited to the specific constructions and arrangements disclosed except only insofar as the appended claims may be so limited, as it will be apparent to those skilled in the art that changes may be made without departing from the principles of the invention.

What is claimed is:

1. An assembly comprising first and second members with said first member being in telescoping relation to said second member and having an annular groove therein, said members having radially aligned passages intersecting said groove, a retainer ring positioned in said groove and having an end tab extending radially of said groove into said passages to secure said members together said tab of said ring being spaced from the sides of said passages and its end engaging the second member at the bottom of the passage in said second member to provide side loading of one of said members relative to the other of said members.

2. An assembly as defined in claim 1 wherein said first and second members are provided with aligned fluid flow ports.

* * * * *